(12) United States Patent
Geschwender

(10) Patent No.: US 6,494,089 B1
(45) Date of Patent: Dec. 17, 2002

(54) RAIN GAUGE

(76) Inventor: Robert C. Geschwender, 6301 Rolling Hills Blvd., Lincoln, NE (US) 68512

( * ) Notice: Subject to any disclaimer, the term of this patent is extended or adjusted under 35 U.S.C. 154(b) by 0 days.

(21) Appl. No.: 09/450,542

(22) Filed: Nov. 30, 1999

(51) Int. Cl.[7] ................................................ G01W 1/00
(52) U.S. Cl. .................................................. 73/170.21
(58) Field of Search ......................... 73/170.21, 170.17, 73/170.18, 170.19, 170.23, 170.22; 116/227; 248/311.2, 300; 91/512; 211/70.1; 137/102, 82; 251/25

(56) References Cited

U.S. PATENT DOCUMENTS

| | | | | |
|---|---|---|---|---|
| 2,513,605 A | * | 7/1950 | Vernon | 248/311.2 |
| 2,907,206 A | * | 10/1959 | O'Neil | 73/170.17 |
| 2,935,872 A | * | 5/1960 | Misner | 91/512 |
| 2,997,876 A | * | 8/1961 | Butzow | 73/170.17 |
| 4,106,336 A | * | 8/1978 | Marley | 73/171 |
| 5,531,114 A | * | 7/1996 | Frager | 73/170.17 |

OTHER PUBLICATIONS

Rain Cones, E–708 and E–706; Enduro Catalog, 1993; p. 28.
Morco Specialty Advertising Products 1991 Catalog; pp. 24–25 (no date).

* cited by examiner

*Primary Examiner*—William Oen
(74) *Attorney, Agent, or Firm*—Vincent L. Carney

(57) ABSTRACT

A rain gauge includes a cylindrical tubular water holder and a flat surface having large rainfall value indicators upon it arranged so that they indicate an amount of rain that has fallen with reference to the water in the water holder and thus are easily readable from a distance. The tubular water holder can be rotated so that indications on it are visible through the curved surface of the cylindrical tube and thus magnified below the water level but not magnified above the water level.

8 Claims, 3 Drawing Sheets

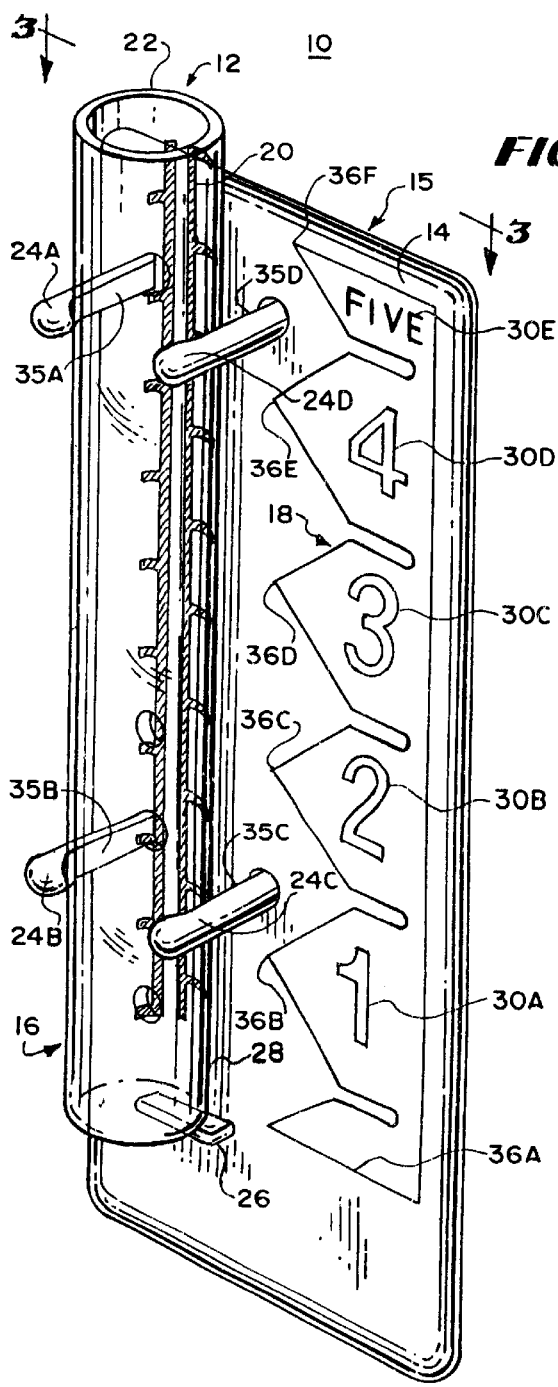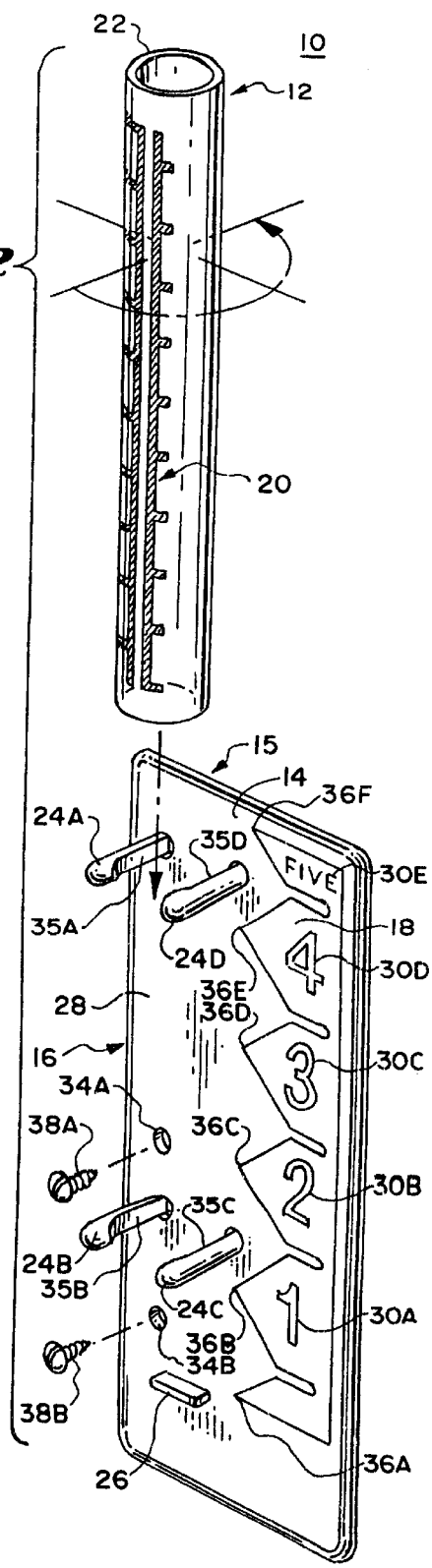

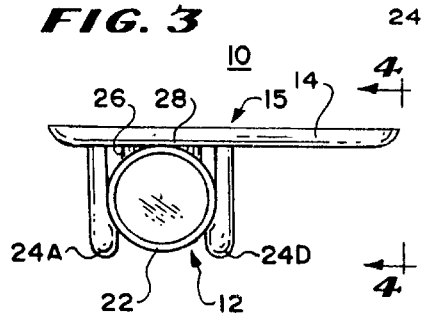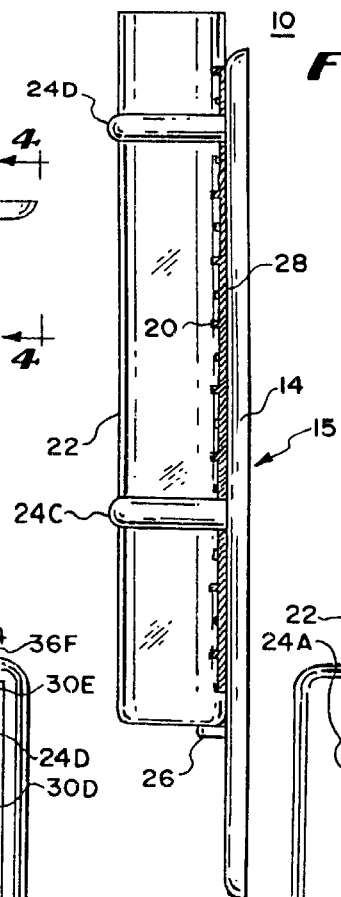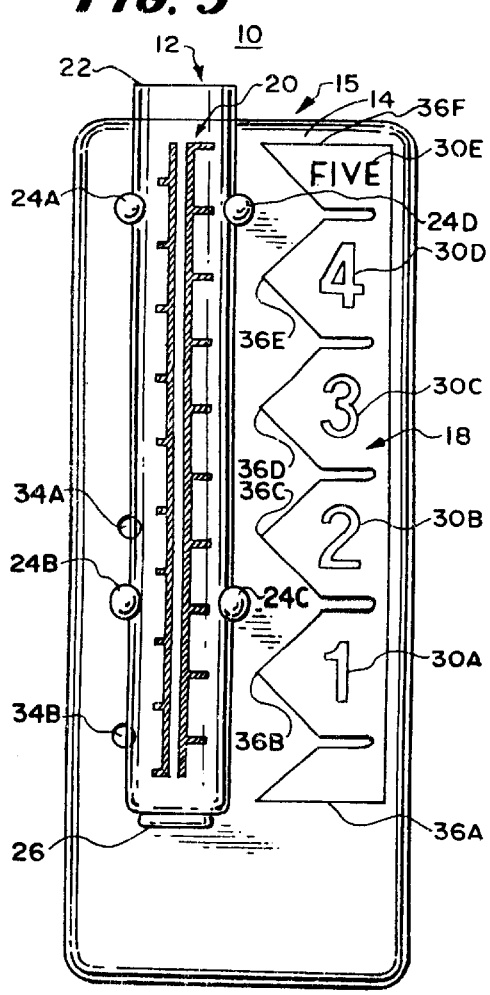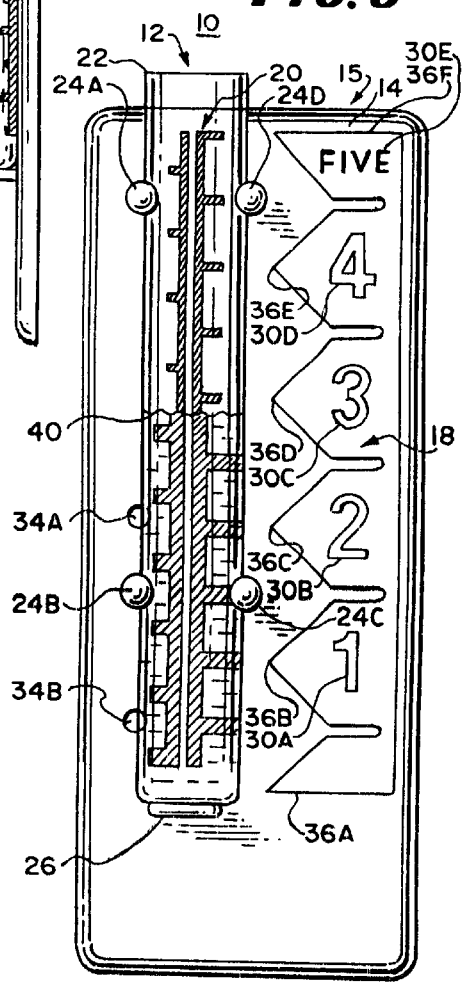

RAIN GAUGE

BACKGROUND OF THE INVENTION

This invention relates to rain gauges.

Rain gauges are known that include a rain collector and large numerals and or words indicating the height of the water in the rain collector. In this class of rain gauge, the rain collector has indications, such as lines, on it to indicate the graduations of water height and the numerals are large enough to be read from several yards away.

One prior art type of rain gauge in this class of known rain gauges includes an adjusting mechanism at the top to collect water from a wider area than the cross section of the rain collector so that the water rises at a multiple of the rainfall per square inch but in proportion to it so there is room for larger numbers on the tube itself to indicate the amount of rain per square inch that has fallen. This type of device is disclosed in U.S. Pat. No. 5,038,606 granted Aug. 13, 1991 to Robert C. Geschwender, et al.

With the prior art it was possible to print large numbers on the curved surface because of its expanded scale; however, with a rain gauge with a normal scale and low cost glass tube collector, there is insufficient area to print large clear numbers that can be easily read due to the reduced size and the curved surface of the collector.

SUMMARY OF THE INVENTION

Accordingly, it is an object of the invention to provide a novel rain gauge.

It is a further object of the invention to provide a rain gauge in which it is exceptionally easy to read the numerals indicating the amount of rain that has fallen.

It is a still further object of the invention to provide a rain gauge in which large numerals on a substantially flat surface are used to indicate the height of the water in a rain collector.

It is a still further object of the invention to provide a rain gauge with an exceptionally clear indication of water height indicated on the holder for the rain gauge.

It is a still further object of the invention to provide a rain gauge that is relatively inexpensive to manufacture as compared to prior art rain gauges.

In accordance with the above and further objects of the invention, the rain gauge of this invention comprises a water holder arranged with a flat surface to indicate with large flat numerals and/or words the height of the rain in the holder. In the preferred embodiment, the rain holder is a transparent tube with indicator marks upon it showing height of water and some of which indicate a scale below the water level. The tube can be separated from the flat surface that indicates the level of the water to facilitate emptying and cleaning and the like. Thus it includes a mounting means for the water holder that is mounted together with the flat surface with the large numerals or other lettering upon it. In the preferred embodiment, the flat surface is integrally formed with the mounting means for the water holder. Means are also provided to mount the rain gauge upright.

The large numerals cooperate with the indications on the water holder to indicate the level of the water as the water rises. The surface of the water is clearly indicated. This is done in the preferred embodiment by having the indications such as calibration and water level indicator lines seen through a curved water holder, thus providing magnification for the indications seen through the curved surface and the water up to the surface of the water above where the indications will appear much smaller. However, any other mechanism might be used such as a float of the type described in the aforementioned U.S. Pat. No. 5,038,606.

From the above description, it can be understood that the rain gauge of this invention has advantages of being easily readable from a distance and easily manufactured.

SUMMARY OF THE DRAWINGS

The above noted and other features of the invention will be better understood from the following detailed description when considered in connection with the accompanying drawings, in which:

FIG. 1 is a perspective view of an embodiment of rain gauge in accordance with the invention.

FIG. 2 is an exploded perspective view of the rain gauge of FIG. 1.

FIG. 3 is a top view of the rain gauge of FIG. 1.

FIG. 4 is a right-hand side elevational view of the rain gauge of FIG. 1 shown in the direction of the lines 4—4 of FIG. 3.

FIG. 5 and FIG. 6 are front elevational views of the rain gauge of FIG. 1 forming together a developed view with FIG. 5 showing an empty water holder indicating no rain has fallen and FIG. 6 indicating a rain gauge in which the rain that has fallen is slightly less than three inches.

DETAILED DESCRIPTION OF THE PREFERRED EMBODIMENT

Figure 7:
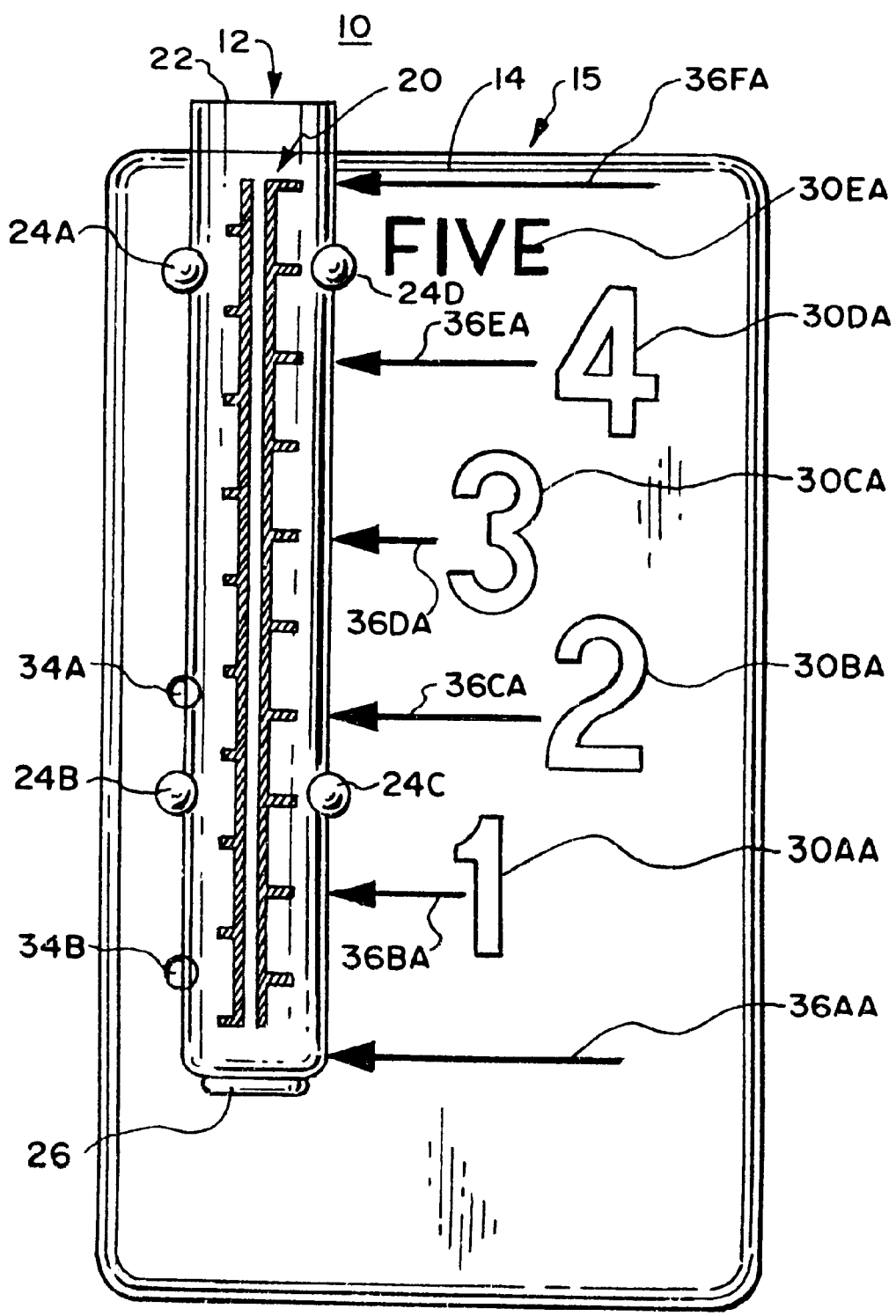
FIG. 7 is a front elevational view of another embodiment of the invention.

In FIG. 1 there is shown a perspective view of a rain gauge 10 comprising a rain holder 12 and an area 18 with large numerals and letters on a flat surface 14 positioned on a continuous solid member 15 next to the rain holder 12. The area 18 is arranged to provide a relationship between the level of water in the rain holder 12 and large easily readable lettering on the flat surface 14. This relationship is between the amount of water in the rain holder 12 and the value of rainfall in inches as indicated on the flat surface 14. While in the preferred embodiment, the rain holder 12 is separable from the flat surface, it may be integrally formed as well such as by molding with the solid member 15. The solid member 15 may have openings but preferably has a continuous section to provide a flat surface 14.

To provide a removable rain holder as a preferred embodiment, the rain holder 12 is a transparent tube 22 such as a cylindrical, glass tube 22 that is adjacent to a flat surface 14 having numerals indicating the height of the water in the transparent tube 22. The transparent tube 22 is cylindrical for ease in manufacturing although it could have other shapes. It includes visible indication lines 20 and the lettering on the flat surface 14 next to it is large and has an indication of the exact values in connection with some of the indication lines 20 on the transparent tube 22 so that they will indicate the amount of water. The best results are achieved if the lines that indicate water levels are in substantially the same plane with the values on the flat surface for easy correlation. The lines serving only to show where the surface of the water is or to indicate graduations between lines connected to the surface can be in the same plane or a different plane and serve their purpose if seen through the curved water surface against the tube 22. More specifically, a flat, plastic holder base or surface 14 has mounted to it the rain holder 12. For this purpose, a mounting means 16 to removably hold the glass tube 22 is integrally formed with the flat surface 14.

Numerals 30A–30D and the word five at 30E on the flat surface 14 indicate the amount of rain that has fallen and are of sufficient size to be clearly visible. Generally, they are approximately one-half inch in height and should be between a quarter of an inch and seven-eighths of an inch in height to fit between the indication lines 20 that indicate one inch as marked on the glass tube 12. This dimension is suitable for those glass tubes that indicate in a directly proportional manner the number of inches in the height of the water in the tube 12 with the inches of rainfall. With a special adapter mount such as that shown in U.S. Pat. No. 5,038,606, the disclosure of which is incorporated herein for reference, the indications on the flat surface 14 can be still further enlarged for clarity.

Generally the width of the numbers can be adapted for stylistic purposes to the height of the numbers. To provide a more precise indication of rainfall, there are also pointers, which include straight lines 36A and 36F, indicating respectively a zero value and the top or five inch value and pointers 36B–36E centered on numerals. The pointers are located more closely adjacent to the rain holder 12 than the letters and numerals or other indications indicating the numeric value of rainfall.

The rain holder 12 which is the tube 22 in the preferred embodiment may be of transparent plastic or glass or any other material and have indication lines 20 along its length to relate to the numerals 30A through 30D and the word five at 30E on the flat surface 14 as well as the pointers 36A–36F. The tube 12 may be of any diameter or length so that it indicates inches in height of water proportionally to inches of rainfall in inches but for convenience, the cylindrical tube 22 has an inner diameter of approximately three-fourths of an inch but can be of any other diameter or area in a proportional rain holder 12. Tube 22 is cylindrical with a flat bottom supported by a bottom member with surface 26 and side holder members 24A–24D arranged to hold it with an exposed surface for reading purposes. Thus, the rain collector mounting means 16 holds the rain collector 12 on slightly more than three sides, but other arrangements would be possible for holding it in place and other shapes would be possible. In the preferred embodiment, the side holder members 24A–24D are arranged in pairs in two locations on each side of the tube 22 and have curved inner sides 35A–35D to match the curves of the tube 22 which tube rests on the bottom member 26.

In the preferred embodiment, the back of the tube 22 is against the surface 14 and is indicated at 28 with the bottom member 26 extending from the flat surface 14 and formed integrally therewith. A plurality of indica lines 20 extend up the length of the tube 22 indicating at increments the height of the water such as in inches and half of inches or any other appropriate indications. In the preferred embodiment, two columns are used for convenience, one indicating the halfway measure of the other.

In the preferred embodiment, to make the surface level more distinct, it is viewed through the tube 22 so that the indication lines 20 underneath or behind the glass tube 22 are magnified along the portion of the tube 22 containing water but not magnified above the water line to indicate the surface of the water although other measures could be used such as the float that is used in U.S. Pat. No. 5,038,606. However, it is less expensive to view the magnified indications through the glass. The indications could be on the face of the flat surface 14 behind the collector if the flat surface 14 is solid as is the case in the preferred embodiment but if the flat surface 14 is open, then it would be desirable to have the indications printed or otherwise available on the tube 22 itself as in the case of the preferred embodiment. Of course, the top surface of the bottom member 26 must be placed so that the inner surface of the bottom of the collector is flush with the empty indicator pointer 36A.

In FIG. 2, there is shown an exploded perspective view of the embodiment 10 of rain gauge showing the rain holder 12 which is a cylindrical tube 22 separated from the flat surface 14 that serves as a convenient easily readable surface on which to indicate values of rainfall and that also includes the mounting means 16 for the rain holder 12. As shown in this view, the rain holder 12 is cylindrical and is shown rotated 180 degrees from its normal position so that, in FIG. 2, the indication lines 20 are shown in a forward position for clarity. The tube 22 itself is approximately five and seven-eighths inches long with the top or five inch marker being five inches from the inner bottom surface. The outer diameter of the glass tube 22 is sized to fit conveniently within the side holder members 24A–24D which serve as a portion of the holder and have an inner curvature 35A–35D substantially matching the curvature of the outside of the tube 22. The first value marker 36A is only a pointer indicating no rainfall and is located in juxtaposition with the top surface of the bottom of the tube 22 to provide accurate registration between the pointers 36A–36F respectively which extend close to and point more directly at the tube 22. The positioning of the numerals accommodates the distance between the top surface of the bottom member 26 and the inner wall of the tube 22 so that the pointer 36A points directly at the zero value and the one through five values 30A–30E are accordingly positioned with respect to each other. The pointers are also accurately adjusted to the correct levels for zero to five inches in height of the water. The pointers 36A–36F preferably end just beyond the projection of the outline of the tube so they are not seen through the water and thus distorted.

The pointers 36A–36F and the numerals or words 30A–30E are of distinctive colors to provide a contrast between the background and each other. In the preferred embodiment the numerals or words 30A–30E and the plastic background of the flat surface 14 are white whereas the remainder of the pointers 36A–36F are black leaving white dividing lines between each pointer. The pointers have triangular tips which give an adequate indication of the height of the water.

In the preferred embodiment, one mode of mounting the rain gauge 10 is by apertures or holes 34A and 34B that can accommodate the fasteners to a flat surface or the like. The fasteners may be wood screws such as those shown at 38A and 38B (FIG. 2). Although wood screws 38A and 38B and holes 34A and 34B are shown in the preferred embodiment, many other mounting devices could be used such as fasteners, adhesive of one kind or another, sharpened ends or flanges to accommodate vertical screws, nails or stakes to mound the rain gauge to a flat horizontal surface or a hanging mechanism that can be hooked over the top of a surface such as a fence or rail.

In FIG. 3, there is shown a top view of the preferred embodiment of rain gauge 10 showing the open tube 22 for serving as a rain holder 12 with the side holder members 24A and 24D at the top and the flat mounting surface 14 for the letters supporting the outwardly extending side holder members 24A and 24D. In FIG. 4, there is shown a side elevational view indicating the indication lines 20 on the back of the tube 22 against the flat surface 14 so that they can be seen through the tube 22 in the sectional view 44 through the longitudinal center line.

In FIG. 5 and FIG. 6 there are shown two front elevational views serving as a developed view illustrating the effect of the water height 40 (FIG. 6). As shown in FIG. 5, when the tube 22 is empty, when looking through the tube 22 the indication lines 20 are of approximately the same size and distinctness. Whereas when there is water as in FIG. 6, the indication lines 20 are magnified up to the water height 40 in the tube 22 so as to provide an indication at a distance that can be correlated with the large numbers on the right-hand side and indicate the height of the water in a manner more economical than for example a float would be.

In FIG. 7 there is shown a front elevational view of another embodiment of the invention illustrating the versatility made available by using a flat surface next to the water holder 12 to show the rainfall values. In this embodiment the identical parts to the prior embodiment have the same reference number and new parts have the letter "A" added to them. As shown in this embodiment, the use of the flat surface 14 permits the value indications such as numerals or words 30AA–30EA to be staggered with respect to each other vertically so as to permit an even larger size and thus make the rain gauge readable from an even greater distance than the embodiment of FIG. 1. Other arrangements can obviously be used to achieve other effects because of the flat surface on which the value indicators are placed.

This rain gauge 10 is particularly economical to manufacture. The flat surface 14 may be injection molded out of plastic inexpensively without the need for expensive molds since it is simple in construction and without undercuts. The colored numerals or words 30A–30E may be easily applied since they are on a flat surface 14 and large and the rain holders 12 themselves are a standard commodity that can be purchased of an appropriate size for rain gauges.

In use, the tube 22 may be emptied and reinserted within the holder. With the tube inserted down to the bottom member 26 with its top surface exposed to rain, it will accumulate water until the next reading at which time it can be emptied. As the water accumulates, a person from a distance can read the letters alongside the tube 22 and note where the water is by the magnified indication lines 20 behind it to indicate the amount of rain that has fallen.

From the above description, it can be understood that, this invention has several advantages, such as: (1) it is inexpensive to manufacture; (2) it is easy to read from a distance; and (3) it is simple to use.

While a preferred embodiment of the invention has been described with some particularity, many modifications and variations in the invention are possible within the light of the above teachings. Therefore, it is to be understood that, the invention may be practiced other than as specifically described.

What is claimed is:

1. A rain gauge comprising:

a water holder; and a flat surface positioned adjacent to the water holder having rainfall value indications upon the flat surface arranged so that the rainfall value indications indicate an amount of rain that has fallen with reference to rain water in the water holder;

said water holder having indications on said water holder;

at least some of said indications on said water holder being alignable with at least some of said value indications on said flat surface wherein a more accurate reading may be made;

said water holder being rotated so that the indications on the water holder are visible through at least one curved surface, whereby the indications on the water holder are magnified up to the level of water in the water holder to indicate the amount of rainfall.

2. A rain gauge in accordance with claim 1 in which the indications are graduation marks.

3. A rain gauge comprising a rain holder;

said rain holder including a plurality of vertically positioned, horizontal indications on a back side of the rain holder representing water levels whereby the vertically positioned, horizontal indications are magnified for easy reading by viewing through rain water collected.

4. A rain gauge in accordance with claim 3 in which the indications are horizontal lines indicating water level.

5. A rain gauge in accordance with claim 3 in which the indications cooperate with lettering and lines indicating values of rainfall on a substantially flat surface in substantially the same plane or at least some of said indications.

6. A rain gauge in accordance with claim 3 wherein the rain holder is mounted to a flat bracket with a flat surface extending to one side of the rain holder with sufficient area for large numbers that are adjacent to the rain holder and correlate with the indications on the rain holder.

7. A rain gauge in accordance with claim 6 wherein the numbers on the flat surface and the indications on the back side of the rain holder are on near planar surfaces for accurate reading; at least some of said indications being vertical water-level lines.

8. A method of using a rain gauge comprised of a tubular water holder having horizontal water-level indications on the tubular water holder and a flat surface arranged in juxtaposition with the tubular water holder having value indications on the flat surface, comprising the steps of:

mounting the tubular water holder to the flat surface with the horizontal water-level indications on the tubular water holder being visible from the front of the water holder through the tubular water holder, whereby the horizontal water-level indications that are viewed through a portion of the tubular water holder containing water are enlarged indications;

correlating the enlarged indications with the value indications to determine the amount of rainfall.

\* \* \* \* \*